Patented Oct. 27, 1953

2,657,125

UNITED STATES PATENT OFFICE 2,657,125

ORGANIC PEROXIDE AND HYDROPEROXIDE HERBICIDES

Lyle D. Goodhue and Carolyn E. Tissol, Bartlesville, Okla., assignors to Phillips Petroleum Company, a corporation of Delaware No Drawing. Application December 20, 1949,
Serial No. 134,124

8 Claims. (Cl. 71—2.3)

1

This invention relates to herbicidal compositions, that is, weed killers. The term "weed" includes any plant which persists in growing where it is not wanted. Thus, the use of the term "weed" is broad enough to include not only plants harmful to man or animal such as bull nettle, ragweed and the like, but also otherwise desirable plants such as lawn grasses growing on driveways, etc. In one of its aspects the invention relates to a herbicidal composition containing as one of its effective ingredients a peroxide or organic hydroperoxide or an alkali metal salt of said hydroperoxide. In another of its aspects, the invention relates to a herbicidal composition which, in addition to a peroxide or organic hydroperoxide or an alkali metal salt of said hydroperoxide, also contains certain other ingredients which are novel in respect of their inclusion in a herbicidal composition.

It has been found that a peroxide or organic hydroperoxide or an alkali metal salt of said hydroperoxide, applied in certain minimum concentrations to plants, will cause very quick killing of the plants.

An object of this invention is to provide a novel effective ingredient for a herbicidal composition. It is another object of this invention to provide a peroxide or organic hydroperoxide or an alkali metal salt of said hydroperoxide as an effective ingredient for a herbicidal composition. Still another object of this invention is to provide a herbicidal composition containing a peroxide or organic hydroperoxide or an alkali metal salt of said hydroperoxide in admixture with certain other materials the use of which is novel in a herbicidal composition. A further object of the invention is to provide a herbicidal composition containing a peroxide or organic hydroperoxide and/or an alkali metal salt of said hydroperoxide as well as another material which specifically improves the herbicidal efficiency of the composition.

According to this invention, there is provided a herbicidal composition containing as an effective ingredient thereof a peroxide or organic hydroperoxide or an alkali metal salt of said hydroperoxide.

The peroxide compounds which can be used can be represented by the following general formula

ROOR wherein R may be hydrogen, a hydrocarbon radical or a substituted hydrocarbon radical and the R's may be the same or different. The sum of the carbon atoms in the R groups will usually not be greater than 25 although higher molecular weight compounds may be employed if desired. When one R is hydrogen and one R is alkyl, compounds of this type are called hydroperoxides.

Typical peroxide compounds applicable to the

2 present invention when R is hydrogen, an alkyl or an alkenyl group include hydrogen peroxide, tertiary-butyl isopropyl peroxide, tertiary-butyl propyl peroxide, tertiary-butyl propenyl peroxide and the like. When R is an aryl, alkaryl, or aralkyl group, typical compounds include methyl nitrophenyl peroxide, methyl p-chlorophenyl peroxide, methyl phenyl peroxide, methyl methoxyphenyl peroxide, methyl isopropylbenzene peroxide, tertiary-butyl isopropylbenzene peroxide and the like. When R is cycloalkyl or cycloalkenyl, typical compounds include propyl cyclohexyl peroxide, methyl cyclopentenyl peroxide, tertiary-butyl cyclooctyl peroxide and the like. When R is an acyl radical a typical compound is tertiary-butyl benzoyl peroxide.

The hydroperoxide compounds which can be used can be represented by the following general formula

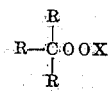

wherein R may be hydrogen, a hydrocarbon radical or a substituted hydrocarbon radical and the three R's may be alike or different or two R's may form a carbocyclic ring or two R's may be included in a carbocyclic structure; X may be hydrogen or an alkali metal atom. Not more than two R's may be hydrogen at the same time. The sum of the carbon atoms in the R groups will be at least three and not more than 30 although higher molecular weight compounds may be employed if desired.

Also according to this invention certain specific combinations of one or more of the hydroperoxides, or one or more of their salts, can be used or admixed with certain other materials, set forth below, to yield highly efficacious herbicidal compositions.

Typical compounds applicable to the present invention when R is an alkyl or an alkenyl group include trimethylhydroperoxymethane (tertiarybutyl hydroperoxide), dimethylpropenylhydroperoxymethane, and the like. When R is an aryl, alkaryl, or an aralkyl group, typical compounds include dimethyl - (nitrophenyl) hydroperoxymethane, dimethylphenylhydroperoxymethane (isopropylbenzene hydroperoxide), dimethyl (phenylpropyl) hydroperoxymethane and dimethyl (butenylphenyl) hydroperoxymethane. When R is cycloalkyl or cycloalkenyl, typical compounds include dimethylcyclohexylhydroperoxymethane, dimethylcyclopentenylhydroperoxymethane, and dimethylcyclooctylhydroperoxymethane. When two R's form a partially hydrogenated polynuclear residue, tetralin hydroperoxide is a typical compound. Other hydroperoxides which can be employed are cumene hydroperoxide, chlorocumene hydroperoxide, methoxycumene hydroperoxide, and chlorodiisopropylbenzene hydroperoxide.

The compounds mentioned herein are effective for the eradication of noxious or undesirable weeds when applied thereto in any suitable form such as solutions, powders, creams, aerosols, as pure compounds, whether in crystalline or liquid, or in emulsion form, or as peroxide or as hydroperoxide concentrates. We have found that it is convenient to dissolve a peroxide or a hydroperoxide of the types disclosed above in a suitable solvent or otherwise employ it in a suitable carrier and to apply the composition so formed. Solvents or carriers which we have found applicable to the present invention include those which are substantially inert with respect to the active herbicidal ingredient. Among the materials which have been found useful for this purpose may be included kerosene, naphthas, and hydrocarbons boiling preferably above atmospheric temperatures, petrolatum, liquid polybutadiene, and others. In some instances it may be desirable to employ a solvent medium or carrier which of itself displays a toxic effect on higher plant life and thus gain the benefit of the combined toxicity of both substances at a single application.

If the active herbicidal ingredient is used in a medium having substantially no toxic properties such as petrolatum or an isoparaffinic hydrocarbon fraction boiling between 360° and 410° F. at 760 mm. sold as Soltrol 140, the lower effective limit appears to be about one weight per cent. However, when a toxic solvent is employed, the concentration may be correspondingly decreased. In this case the lower limit appears to be about 0.1 weight per cent. We prefer to use at least one weight per cent as a minimum concentration whether or not the solvent happens to display herbicidal activity. There is no upper limit to the concentration which may be employed, except that dictated by economy.

It is to be noted at this point that the effectiveness of the compounds of this invention appears to be due in large measure to the fact that they have the property of being able to penetrate into the conducting tissue of the plant. The compounds of the invention therefore appear to fit the definition of "translocated or systemic herbicides." They do not merely injure the plant at the point of contact but move to other parts of the plant and destroy it from within.

It is an advantage of our novel herbicides that they are quick acting, often destroying plants to which applied within a period of about one hour. It is a further advantage of our novel herbicides that they do not render the soil sterile over which applied.

Compositions containing a compound of the present invention as a principal herbicidal ingredient may be applied for their intended purpose in several different ways. The most advantageous and presently preferred way, especially when treating large areas, is to spray a liquid composition on the leaves of the plants to be exterminated. This method takes advantage of the normal path taken by naturally occurring hormones.

The amount of herbicidal composition to be applied will be determined by the method of application. For example when a liquid composition is sprayed on the plants, sufficient material should be applied to wet the plants with a minimum amount running from the leaves.

The following are examples of peroxide containing herbicidal compositions which are effective for the practice of our invention:

*Example I*

|  | Parts |
|---|---|
| Cumene tert.-butyl peroxide | 4 |
| Stoddard solvent | 96 |

*Example II*

Cumene isopropyl peroxide is used instead of the cumene tert.-butyl peroxide of Example I.

*Example III*

|  | Parts |
|---|---|
| Cumene n-propyl peroxide | 1 |
| Petrolatum | 99 |

*Example IV*

Cumene tert.-butyl peroxide is used instead of the cumene n-propyl peroxide of Example III.

*Example V*

Cumene isopropyl peroxide is used instead of the cumene n-propyl peroxide of Example III.

*Example VI*

|  | Parts |
|---|---|
| Cumene n-propyl peroxide | 4 |
| Liquid polybutadiene | 96 |

Certain easily grown plants are good indicators of the herbicidal action of chemicals and can be used for the laboratory testing of herbicides. Black Valentine and black wax beans between one and two weeks old were used in the following examples which will serve to illustrate the effectiveness of the compositions of our invention.

*Example VII*

About 0.05 ml. of the composition of Example III was applied to each leaf of four young bean plants. Severe burning of the plants was observed 24 hours after application.

*Example VIII*

The experiment of Example VII was repeated using a one per cent solution of tert.-butyl benzoyl peroxide. Burning of the plants was observed 24 hours after application.

*Example IX*

The experiment of Example VII was repeated using a one per cent solution of cumene tert.-butyl peroxide. Severe burning of the plants was observed 24 hours after application.

*Example X*

One drop of cumene isopropyl peroxide applied to the leaf of a young bean plant killed the whole plant. The compound was translocated down the stem and bleaching of the chlorophyll was observed.

The following are several examples of hydroperoxide compound containing herbicidal compositions made according to our invention:

*Example XI*

|  | Parts |
|---|---|
| Isopropylbenzene hydroperoxide | 4 |
| Stoddard solvent | 96 |

*Example XII*

Diisopropylbenzene hydroperoxide was used instead of the isopropylbenzene hydroperoxide of Example XI.

*Example XIII*

|  | Parts |
|---|---|
| Isopropylbenzene hydroperoxide | 4 |
| Petrolatum | 96 |

Example XIV

Diisopropylbenzene hydroperoxide was used instead of the isopropylbenzene hydroperoxide of Example XIII.

Example XV

Tertiary-butylisopropylbenzene hydroperoxide was used instead of the isopropylbenzene hydroperoxide of Example XIII.

Example XVI

| | Parts |
|---|---|
| Isopropylbenzene hydroperoxide | 4 |
| Polybutadiene | 96 |

Example XVII

Tertiary-butylisopropylbenzene hydroperoxide is used instead of the isopropylbenzene hydroperoxide of Example XVI.

Example XVIII

| | Parts |
|---|---|
| Tertiary-butyl hydroperoxide | 4 |
| Hydrofluoric acid soluble oil | 96 |

Example XIX

Isopropylbenzene hydroperoxide was used instead of the tertiary-butyl hydroperoxide of Example XVIII.

The following additional examples serve to illustrate the effectiveness of the compositions of the invention.

Example XX

The composition of Example XI was sprayed on a field test plot and compared with a control plot sprayed with Stoddard solvent. An amount of spray sufficient to wet the leaves of the plants was employed in each case. The effect on the plot sprayed with the composition containing isopropylbenzene hydroperoxide was more than double the effect of the Stoddard solvent alone. A complete kill was effected on the plot sprayed with the hydroperoxide composition and about three weeks after the treatment the reduction in weeds was still very marked. Weeds killed were bull nettle, rag weed, wild grasses and others.

As stated, certain easily grown plants are good indicators of the herbicidal action of chemicals and can be used for the laboratory testing of herbicides. Black Valentine and black wax beans between one and two weeks old were used in the following examples

Example XXI

Approximately 0.5 gram of the composition of Example XIV was applied to the stems of young bean plants with a glass stirring rod. All parts of the plants above the treatment were killed in five to six hours after the treatment. Translocation up into the leaves was observed.

Example XXII

The experiment of Example XXI was repeated using the composition of Example XV. All parts of the plants above the treatment were killed in five to six hours. Translocation up into the leaves was observed.

Example XXIII

An appropriate 0.1 gram portion of a concentrate containing 60 weight per cent of tertiary-butyl hydroperoxide was applied to the stem of a young bean plant. The tissue under the treated portion collapsed within an hour.

The use of sprouting Zenith rice as an indicator of herbicidal action is reported in the following examples. The method consists in placing a small amount of the chemical (1 to 20 mg.) in the center of a nine cm. filter paper previously placed in a 10 cm. petri dish. Five to six cc. of water was added and ten plump kernels of rice were placed in a circle around the chemical. The petri dishes were covered and placed at 70° F. to sprout the rice. An untreated check group was always prepared and run simultaneously with the tests. The ratio of the growth of the stems and roots in the treated to those in the untreated dishes is used as the criterion. Readings for the following tests were made on the seventh day.

Example XXIV

On sprouting rice tertiary-butylisopropylbenzene hydroperoxide at five mg. in the petri dish test prevented growth.

Example XXV

On sprouting rice diisopropylbenzene hydroperoxide at five mg. in the petri dish test prevented growth.

Example XXVI

On sprouting rice isopropylbenzene hydroperoxide at five mg. allowed only 0.5 the growth of the check.

The following data not only show the results which have been obtained by certain hydroperoxides other than those shown in the preceding examples, but show also that the closely related parent compounds, not hydroperoxides, had no effect upon weeds. It will be recognized by those skilled in the art that comparison of a plant's condition after a number of hours, for example of the order of five hours, with its condition after a further number of hours such as twenty four is rather difficult. Thus the seemingly illogical results in "Number 7" are thus explained.

In the tests summarized below the compounds were dissolved in mineral oil to provide a concentration of 1 per cent based on hydroperoxide and 0.05 ml. of this solution was applied to one leaf of each of four young bean plants. Since the hydroperoxides were obtained as solutions in the parent hydrocarbon, checks were made by applying mineral oil solutions of the parent hydrocarbon alone. For purposes of comparison, cumene hydroperoxide was tested in a similar manner. Data on these tests are tabulated below.

| No. | Compound Tested | Conc. (percent) | Effect [1] 5 hrs. | Effect [1] 24 hrs. |
|---|---|---|---|---|
| 1 | Chlorocumene Hydroperoxide | 1.0 | M | M |
| 2 | Chlorocumene (not a hydroperoxide) | 10.0 | O | O |
| 3 | Cumene Hydroperoxide in 2 | 1.0 | Sl− | Sl+ |
| 4 | Chlorodiisopropylbenzene Hydroperoxide | 1.0 | M+ | M+ |
| 5 | Chlorodiisopropylbenzene (not a hydroperoxide) | 5.9 | O | O |
| 6 | Cumene Hydroperoxide in 5 | 1.0 | M | M |
| 7 | Methoxycumene Hydroperoxide | 1.0 | S− | M |
| 8 | Methoxycumene (not a hydroperoxide) | 8.3 | O | O |
| 9 | Cumene Hydroperoxide in 8 | 1.0 | M | M |
| 10 | Cumene Hydroperoxide in oil | 1.0 | Sl+ | Sl+ |

[1] S=Severe; M=Moderate; Sl=Slight; O=None.

However, the five hour observations are conclusive of the effectiveness of the compounds employed if at that time noticeable modification has occurred.

Reasonable variation and modification are possible within the scope of the foregoing disclosure and the appended claims to the invention the essence of which is that certain peroxides and hydroperoxides, as well as alkali metal salts of said hydroperoxides, have been found effective as weed killers.

We claim:

1. The method of destroying a plant which comprises applying to said plant a herbicidal amount of a material selected from the group consisting of a peroxide of the formula $$R-O-O-R$$

wherein each R is selected from the group consisting of a hydrocarbon radical and a substituted hydrocarbon radical and wherein the sum of the carbon atoms in the R groups is not in excess of 25, and an organic hydroperoxide of the formula $$R-\underset{\underset{R}{|}}{\overset{\overset{R}{|}}{C}}-O-O-X$$

wherein each R is selected from the group consisting of hydrogen, a hydrocarbon radical, a substituted hydrocarbon radical, and a carbocyclic ring wherein two R's are included in said carbocyclic ring; X is selected from the group consisting of hydrogen and an alkali metal atom; not more than two R's shall be hydrogen at the same time and the sum of the carbon atoms in the R groups shall be at least 3 and not in excess of 30.

2. The method of claim 1 wherein said material is an organic peroxide of the formula $$R-O-O-R$$

wherein each R is selected from the group consisting of a hydrocarbon radical and a substituted hydrocarbon radical and wherein the sum of the carbon atoms in the R group is not in excess of 25.

3. The method of claim 1 wherein the material is an organic hydroperoxide of the formula $$R-\underset{\underset{R}{|}}{\overset{\overset{R}{|}}{C}}-O-O-X$$

wherein each R is selected from the group consisting of hydrogen, a hydrocarbon radical, a substituted hydrocarbon radical, and a carbocyclic ring wherein two R's are included in said carbocyclic ring; X is selected from the group consisting of hydrogen and an alkali metal atom; not more than two R's shall be hydrogen at the same time and the sum of the carbon atoms in the R groups shall be at least 3 and not in excess of 30.

4. The method of destroying a plant which comprises applying to said plant a herbicidal amount of tert.-butyl benzoyl peroxide.

5. The method of destroying a plant which comprises applying to said plant a herbicidal amount of isopropylbenzene hydroperoxide.

6. The method of destroying a plant which comprises applying to said plant a herbicidal amount of a diisopropylbenzene hydroperoxide.

7. The method of destroying a plant which comprises applying to said plant a herbicidal amount of tertiary-butylisopropylbenzene hydroperoxide.

8. The method of destroying a plant which comprises applying to said plant a herbicidal amount of tertiary-butyl hydroperoxide.

LYLE D. GOODHUE.
CAROLYN E. TISSOL.

References Cited in the file of this patent

FOREIGN PATENTS

| Number | Country | Date |
|--------|---------|------|
| 622,405 | France | May 30, 1927 |

OTHER REFERENCES

"A Comprehensive Treatise on Inorganic and Theoretical Chemistry," by J. W. Mellor, vol. 2 (1922), pages 490 and 491.